UNITED STATES PATENT OFFICE.

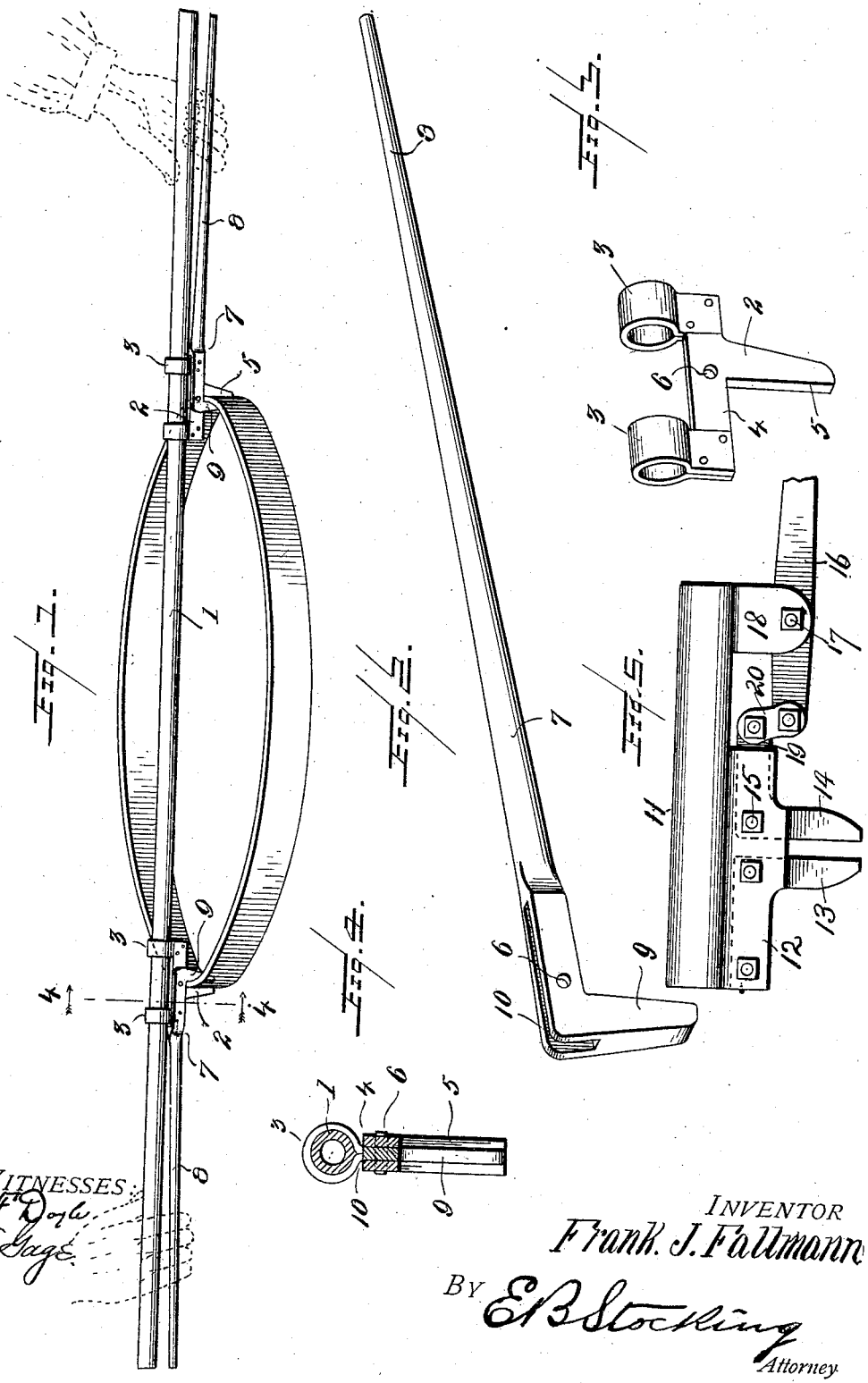

FRANK J. FALLMANN, OF WALNUT GROVE, CALIFORNIA.

TIRE-HANDLING TOOL.

No. 869,166. Specification of Letters Patent. Patented Oct. 22, 1907.

Application filed February 23, 1907. Serial No. 358,947.

*To all whom it may concern:*

Be it known that I, FRANK J. FALLMANN, a citizen of the United States, residing at Walnut Grove, in the county of Sacramento State of California, have invented certain new and useful Improvements in Tire-Handling Tools, of which the following is a specification, reference being had therein to the accompanying drawing.

This invention relates to a tool for handling tires, and particularly to a device for handling the tires while hot preparatory to placing them upon the wheel.

The invention has for an object to provide a tool comprising a plurality of tongs which may be adjusted for use with any size of tire to engage the same at opposite points whereby a single tool may be used for handling all classes of work regardless of the dimension of character of tire being manipulated.

Other and further objects and advantages of the invention will be hereinafter set forth and the novel features thereof defined by the appended claims.

In the drawing:—Figure 1 is a perspective of the invention in position for use; Fig. 2 is a perspective of one of the tong jaws; Fig. 3 is a similar view of the coöperating jaw, Fig. 4 is an enlarged section on the line 4—4, Fig. 1, and Fig. 5 is an elevation of a modified form of tong member.

Like numerals refer to like parts in the several views of the drawing.

Referring to the drawing the numeral 1 designates a pipe or rod which may be of any desired length or diameter upon which the member 2 is slidably mounted by means of the sleeves 3 having integral parallel plates embracing and secured to the jaw plate 4 by means of rivets or other suitable fastening devices. From this plate 4 the depending tong jaw 5 is extended, and pivoted to this plate at 6 is the coöperating tong member 7 having the handle 8 and the depending tong jaw 9 formed at one end thereof. This member 7 has the slot 10 formed therein, as shown in Fig. 2, in which the plate 4 is mounted when the parts are assembled, with the jaw 5 extending downwardly therethrough so that the jaws may be brought into engagement and alinement, as shown in Fig. 1.

In Fig. 5, a modified form of tong members is shown comprising the sleeve 11 having the depending portion 12 upon which the fixed jaw 13 is secured, while the pivoted jaw 14 is also mounted on the part 12 by means of the pivot 15. These parts are actuated by the handle lever 16 which is pivotally mounted at 17 in a depending lug 18 from the sleeve and connected with the arm 19 of the pivoted jaw 14 by means of a link 20. The parts in this form of the invention operate in substantially the same manner as those hereinbefore described, while the lever and link connection with the pivoted jaw permit a full play and the most desirable leverage for securing the gripping action upon the tire or other object to be engaged by the tongs.

In the operation of the invention, the slidable member is slipped upon the rod, which serves as one handle of the tongs, and the tire gripped between the jaws by pulling the handle of the slotted member upward toward the rod, as shown in Fig. 1. It will be obvious that by slidably mounting the members upon the rod, the tool may be used with any diameter of tire, it only being necessary to slip the tongs toward or from each other on the rod until they are in proper position to embrace and grip the tire between the jaws at opposite points. From the foregoing it will be seen that the invention provides a very simple, efficient and economical tool for use by blacksmiths or wheelwrights in handling hot tires preparatory to placing them upon the wheel.

Having now described my invention and set forth its merits, what I claim and desire to secure by Letters Patent is:—

1. In a device of the class described, a supporting rod, a sleeve slidably mounted thereon and having a depending plate therefrom, a jaw provided with a plate at its upper portion fixedly secured to the sleeve plate and parallel therewith, and a companion jaw pivoted in coöperating relation to said fixed jaw.

2. In a device of the class described, a supporting rod, a sleeve slidably mounted thereon and having a depending plate therefrom, a jaw provided with a plate at its upper portion fixedly secured to the sleeve plate and parallel therewith, and an angular companion jaw slotted inward from the angle thereof to embrace a portion of the plate of the fixed jaw.

3. In a device of the class described, a rod, a sleeve, slidably mounted thereon, a fixed jaw having a plate at its upper portion connected to said sleeve, a coöperating angular jaw slotted inward from the angle thereof to embrace one end of said jaw plate and pivoted to said plate, and an operating handle extending from the slotted jaw.

In testimony whereof, I affix my signature in presence of two witnesses.

FRANK J. FALLMANN.

Witnesses:
 JOHN S. BROWN,
 N. C. McQUEEN.